(12) United States Patent
Givoni et al.

(10) Patent No.: US 7,093,238 B2
(45) Date of Patent: Aug. 15, 2006

(54) AUTOMATED SOFTWARE TESTING AND VALIDATION SYSTEM

(75) Inventors: Ethan Givoni, Framingham, MA (US); Naomi Albert, Boston, MA (US); Ziv Ravitz, Boston, MA (US); Thang Quoc Nguyen, Placentia, CA (US); Thieu Nguyen, Santa Ana, CA (US)

(73) Assignee: AccordSQA, Inc., Framingham, MA (US)

( * ) Notice: Subject to any disclaimer, the term of this patent is extended or adjusted under 35 U.S.C. 154(b) by 457 days.

(21) Appl. No.: 10/208,649

(22) Filed: Jul. 29, 2002

(65) Prior Publication Data

US 2003/0126517 A1 Jul. 3, 2003

Related U.S. Application Data

(60) Provisional application No. 60/308,453, filed on Jul. 27, 2001.

(51) Int. Cl.
*G06F 9/44* (2006.01)
(52) U.S. Cl. .................... 717/129; 717/125; 717/126
(58) Field of Classification Search ................ 717/109, 717/120–129, 100–101
See application file for complete search history.

(56) References Cited

U.S. PATENT DOCUMENTS

| | | | | |
|---|---|---|---|---|
| 5,414,836 A | * | 5/1995 | Baer et al. | 714/38 |
| 5,600,789 A | * | 2/1997 | Parker et al. | 714/38 |
| 5,758,061 A | * | 5/1998 | Plum | 714/35 |
| 5,781,720 A | * | 7/1998 | Parker et al. | 714/38 |
| 6,275,976 B1 | * | 8/2001 | Scandura | 717/120 |
| 6,349,393 B1 | * | 2/2002 | Cox | 714/38 |
| 6,505,342 B1 | * | 1/2003 | Hartmann et al. | 717/104 |
| 6,701,514 B1 | * | 3/2004 | Haswell et al. | 717/115 |
| 6,725,399 B1 | * | 4/2004 | Bowman | 714/38 |
| 6,775,824 B1 | * | 8/2004 | Osborne et al. | 717/125 |
| 6,810,364 B1 | * | 10/2004 | Conan et al. | 702/188 |
| 6,898,784 B1 | * | 5/2005 | Kossatchev et al. | 717/126 |
| 6,907,546 B1 | * | 6/2005 | Haswell et al. | 714/38 |
| 6,944,848 B1 | * | 9/2005 | Hartman et al. | 717/124 |
| 6,948,154 B1 | * | 9/2005 | Rothermel et al. | 717/128 |

OTHER PUBLICATIONS

Denaro et al, "Deriving models fo software fault proneness", ACM SEKE, pp. 361-368, 2002.*

Fleurey et al, "Validation in model driven engineering testing model transformations", IEEE, pp. 29-40, 2004.*

(Continued)

*Primary Examiner*—Anil Khatri
(74) *Attorney, Agent, or Firm*—Hamilton, Brook, Smith & Reynolds, P.C.

(57) ABSTRACT

An automated software testing system allows automated test script generation, execution, and result correlation in a recreatable and adaptable manner. A software Application Under Test (AUT) is identified and includes a process having a sequence of Graphical User Interface (GUI) windows. A test thread tree is generated corresponding to the windows in the process. A grid is generated to enumerate test cases indicative of the windows and data objects in the thread. Also generated is a script indicative of each of the test cases. The script is executed to apply each of the test cases to the AUT and receive a response for each test case from the AUT. A report of expected responses is generated, and compared to the actual responses to provide a test result indicative of the status for each test case in question.

30 Claims, 9 Drawing Sheets

OTHER PUBLICATIONS

Overstreet, "Model testing is it only a special case of software testing", ACM Proc. of 2002 winter simulation conf. pp. 641-647, 2002.*

Penix et al, "The first internationl workshop on Automated program analysis testing and verification", ACM SIGSOFT, Software Engineering notes vol. 26, No. 1, pp. 40-43, 2001.*

* cited by examiner

```
//################################################################
//###   SCRIPT VIEW
//################################################################

For (num loop=0; loop < ROWS_NUMBER; loop++)      ~ 76
{
//################################################################
//###   Additional User Code Section 1
//################################################################

//################################################################
//###   End Additional User Code Section 1
//################################################################
```
} 78

```
    //################################################################
    //###   object name - "Date_of_Flight:_0" in "Flight Reservation"
    //################################################################
    If(GRID_DATA[0,loop] != "")
    {
act_on_object(GRID_COLUMNS[0,0].GRID_COLUMNS[1,0].GRID_COLUMNS[2,0].
GRID_DATA[0,loop]);
```
} 80

```
    //################################################################
    //###   Additional User Code For Object -"Date_of_Flight:_0" in "Flight Reservation"
    //################################################################

//################################################################
    //###   End User Code For Object - "Date_of_Flight:_0" in "Flight Reservation"
    //################################################################
```
} 82

```
    }

//################################################################
    //###   object name - "Fly From:_0" in "Flight Reservation"
    //################################################################
    If(GRID_DATA[0,loop] != "")
    {
act_on_object(GRID_COLUMNS[0,1].GRID_COLUMNS[1,1].GRID_COLUMNS[2,1].
GRID_DATA[0,loop]);
```
} 84

Fig. 6c

```
//################################################
//###   Additional User Code For Object - "Fly From:_0" in "Flight Reservation"
//################################################

//################################################
//###   End User Code For Object - "Fly From:_0" in "Flight Reservation"
//################################################

}

//################################################
//###   object name - "Fly To:_0" in "Flight Reservation"
//################################################
    If(GRID_DATA[1,loop] != "")
    { act_on_object(GRID_COLUMNS[0,2].GRID_COLUMNS[1,2].GRID_COLUMNS[2,2].
GRID_DATA[1,loop]);

//################################################
//###   Additional User Code For Object - "Fly To:_0" in "Flight Reservation"
//################################################

//################################################
//###   End User Code For Object - "Fly To:_0" in "Flight Reservation"
//################################################

}
}

//################################################
//###   Additional Termination User Code
//################################################

//################################################
//###   End of Additional Termination User Code
//################################################
```

{86} braces first block
{88} braces If/act_on_object block
{90} braces second additional user code block

101 {
1,7/20/2002,12:33:58.60,Pass,,Update - "loop",0,0,1,20023,
1,7/20/2002,12:33:58.60,Pass,SubString,String - SubString - "12/12/02",Pass,104,1,20008,
1,7/20/2002,12:33:58.170,Pass,General Function,Sent By The Tester,12/12/02,0,1,20010,
1,7/20/2002,12:33:58.170,Pass,Date of Flight:,SetText - "12/12/02",Pass,123,1,20006,
1,7/20/2002,12:33:58.280,Pass,SubString,String - SubString - "Random",Pass,103,1,20008,
1,7/20/2002,12:33:58.390,Pass,General Function,Sent By The Tester,Random,0,1,20010,
1,7/20/2002,12:33:58.390,Pass,Random,Pick Item - "Random",Pass,196,1,20036,
1,7/20/2002,12:33:58.610,Pass,Fly From:_0,Info - "Value",Pass,104,1,20003,    101a
1,7/20/2002,12:33:58.660,Pass,General Function,Sent By The Tester,Random Selection Value: San Francisco,0,1,20010,
1,7/20/2002,12:33:58.720,Pass,SubString,String - SubString - "Random",Pass,103,1,20008,
1,7/20/2002,12:33:58.770,Pass,General Function,Sent By The Tester,Random,0,1,20010,
1,7/20/2002,12:33:58.770,Pass,Random,Pick Item - "Random",Pass,195,1,20036,
1,7/20/2002,12:33:58.990,Pass,Fly To:_0,Info - "Value",Pass,106,1,20003,
1,7/20/2002,12:33:59.100,Pass,General Function,Sent By The Tester,Random Selection Value:Denver,0,1,20010,  — 101b
1,7/20/2002,12:33:59.100,Pass,,Update - "loop",1,0,1,20023, 102 {
102a
2,7/20/2002,12:33:59.100,Pass,SubString,String - SubString - "12/12/02",Pass,101,1,20008,
2,7/20/2002,12:33:59.210,Pass,General Function,Sent By The Tester,12/12/02,0,1,20010,
2,7/20/2002,12:33:59.210,Pass,Date of Flight:,SetText - "12/12/02",Pass,108,1,20006,
2,7/20/2002,12:33:59.320,Pass,SubString,String - SubString - "Denver",Pass,103,1,20008,
2,7/20/2002,12:33:59.430,Pass,General Function,Sent By The Tester,Denver,0,1,20010,
2,7/20/2002,12:33:59.430,Pass,Denver,Pick Item - "Denver",Pass,400,1,20036,   102b
2,7/20/2002,12:33:59.870,Pass,SubString,String - SubString - "London",Pass,103,1,20008,
2,7/20/2002,12:33:59.930,Pass,General Function,Sent By The Tester,London,0,1,20010,
2,7/20/2002,12:33:59.930,Pass,London,Pick Item - "London",Pass,196,1,20036,   102c
2,7/20/2002,12:34:00.150,Pass,,Update - "loop",2,0,1,20023, 103 {
3,7/20/2002,12:34:00.150,Pass,SubString,String - SubString - "12/12/02",Pass,101,1,20008,
3,7/20/2002,12:34:00.260,Pass,General Function,Sent By The Tester,12/12/02,0,1,20010,
3,7/20/2002,12:34:00.260,Pass,Date of Flight:,SetText - "12/12/02",Pass,108,1,20006,
3,7/20/2002,12:34:00.370,Pass,SubString,String - SubString - "Paris",Pass,104,1,20008,
3,7/20/2002,12:34:00.480,Pass,General Function,Sent By The Tester,Paris,0,1,20010,
3,7/20/2002,12:34:00.480,Pass,Paris,Pick Item - "Paris",Pass,207,1,20036,
3,7/20/2002,12:34:00.700,Pass,SubString,String - SubString - "London",Pass,104,1,20008,
3,7/20/2002,12:34:00.810,Pass,General Function,Sent By The Tester,London,0,1,20010,
3,7/20/2002,12:34:00.810,Pass,London,Pick Item - "London",Pass,197,1,20036,
3,7/20/2002,12:34:01.30,Pass,,Update - "loop",3,0,1,20023, 104 {
4,7/20/2002,12:34:01.30,Pass,SubString,String - SubString - "12/12/02",Pass,100,1,20008,
4,7/20/2002,12:34:01.140,Pass,General Function,Sent By The Tester,12/12/02,0,1,20010,
4,7/20/2002,12:34:01.140,Pass,Date of Flight:,SetText - "12/12/02",Pass,107,1,20006,
4,7/20/2002,12:34:01.240,Pass,SubString,String - SubString - "London",Pass,103,1,20008,
4,7/20/2002,12:34:01.350,Pass,General Function,Sent By The Tester,London,0,1,20010,
4,7/20/2002,12:34:01.350,Pass,London,Pick Item - "London",Pass,452,1,20036,
4,7/20/2002,12:34:01.790,Pass,SubString,String - SubString - "Paris",Pass,104,1,20008,
4,7/20/2002,12:34:01.900,Pass,General Function,Sent By The Tester,Paris,0,1,20010,
4,7/20/2002,12:34:01.900,Pass,Paris,Pick Item - "Paris",Pass,194,1,20036,
4,7/20/2002,12:34:02.120,Pass,,Update - "loop",4,1,1,20023,

```
  ⎧ 5,7/20/2002,12:34:02.120,Pass,SubString,String - SubString - "12/12/02",Pass,102,1,20008,
  ⎪ 5,7/20/2002,12:34:02.230,Pass,General Function,Sent By The Tester,12/12/02,0,1,20010,
  ⎪ 5,7/20/2002,12:34:02.230,Pass,Date of Flight:,SetText - "12/12/02",Pass,107,1,20006,
  ⎪ 5,7/20/2002,12:34:02.340,Pass,SubString,String - SubString - "London",Pass,103,1,20008,
  ⎪ 5,7/20/2002,12:34:02.450,Pass,General Function,Sent By The Tester,London,0,1,20010,
105⎨ 5,7/20/2002,12:34:02.450,Pass,London,Pick Item - "London",Pass,198,1,20036,
  ⎪ 5,7/20/2002,12:34:02.670,Pass,SubString,String - SubString - "Paris",Pass,105,1,20008,
  ⎪ 5,7/20/2002,12:34:02.780,Pass,General Function,Sent By The Tester,Paris,0,1,20010,
  ⎪ 5,7/20/2002,12:34:02.780,Pass,Paris,Pick Item - "Paris",Pass,197,1,20036,
  ⎩ 5,7/20/2002,12:34:02.950,Pass,,Update - "loop",5,0,1,20023,
  ⎧ 6,7/20/2002,12:34:02.950,Pass,SubString,String - SubString - "12/12/02",Pass,100,1,20008,
  ⎪ 6,7/20/2002,12:34:03.60,Pass,General Function,Sent By The Tester,12/12/02,0,1,20010,
  ⎪ 6,7/20/2002,12:34:03.60,Pass,Date of Flight:,SetText - "12/12/02",Pass,108,1,20006,
  ⎪ 6,7/20/2002,12:34:03.170,Pass,SubString,String - SubString - "Los Angeles",Pass,103,1,20008,
106⎨ 6,7/20/2002,12:34:03.280,Pass,General Function,Sent By The Tester,Los Ange,0,1,20010,
  ⎪ 6,7/20/2002,12:34:03.280,Pass,Los Angeles,Pick Item - "Los Angeles",Pass,197,1,20036,
  ⎪ 6,7/20/2002,12:34:03.500,Pass,SubString,String - SubString - "Paris",Pass,102,1,20008,
  ⎪ 6,7/20/2002,12:34:03.610,Pass,General Function,Sent By The Tester,Paris,0,1,20010,
  ⎩ 6,7/20/2002,12:34:03.610,Pass,Paris,Pick Item - "Paris",Pass,196,1,20036,
    6,7/20/2002,12:34:03.830,Pass,,Update - "loop",6,0,1,20023,
  ⎧ 7,7/20/2002,12:34:03.830,Pass,SubString,String - SubString - "12/12/02",Pass,100,1,20008,
  ⎪ 7,7/20/2002,12:34:03.940,Pass,General Function,Sent By The Tester,12/12/02,0,1,20010,
  ⎪ 7,7/20/2002,12:34:03.940,Pass,Date of Flight:,SetText - "12/12/02",Pass,108,1,20006,
  ⎪ 7,7/20/2002,12:34:04.50,Pass,SubString,String - SubString - "Paris",Pass,103,1,20008,
  ⎪ 7,7/20/2002,12:34:04.160,Pass,General Function,Sent By The Tester,Paris,0,1,20010,
107⎨ 7,7/20/2002,12:34:04.160,Pass,Paris,Pick Item - "Paris",Pass,196,1,20036,
  ⎪ 7,7/20/2002,12:34:04.320,Pass,SubString,String - SubString - "San Fncisco",Pass,103,1,20008,
  ⎪ 7,7/20/2002,12:34:04.430,Pass,General Function,Sent By The Tester,San Fnci,0,1,20010,
  ⎪ 7,7/20/2002,12:34:04.430,Fail,(San Fncisco),Pick Item - "San Fncisco",The requested object is not in
  ⎪ list,16,1,20036,                      107a
  ⎩ 7,7/20/2002,12:34:04.490,Pass,Fly To:_0,SetText - "San Fncisco",Pass,3,1,20006,
    7,7/20/2002,12:34:04.490,Pass,,Update - "loop",7,0,1,20023,
  ⎧ 8,7/20/2002,12:34:04.490,Pass,SubString,String - SubString - "12/12/02",Pass,102,1,20008,
  ⎪ 8,7/20/2002,12:34:04.600,Pass,General Function,Sent By The Tester,12/12/02,0,1,20010,
  ⎪ 8,7/20/2002,12:34:04.600,Pass,Date of Flight:,SetText - "12/12/02",Pass,108,1,20006,
  ⎪ 8,7/20/2002,12:34:04.710,Pass,SubString,String - SubString - "Lonon",Pass,103,1,20008,   108a
  ⎪ 8,7/20/2002,12:34:04.820,Pass,General Function,Sent By The Tester,Lonon,0,1,20010,
  ⎪ 8,7/20/2002,12:34:04.820,Fail,(Lonon),Pick Item - "Lonon",The requested object is not in list,19,1,20036,
  ⎪ 8,7/20/2002,12:34:04.820,Pass,Fly From:_0,SetText - "Lonon",Pass,4,1,20006,
108⎨ 8,7/20/2002,12:34:04.820,Pass,SubString,String - SubString - "Random",Pass,101,1,20008,
  ⎪ 8,7/20/2002,12:34:04.920,Pass,General Function,Sent By The Tester,Random,0,1,20010,
  ⎪ 8,7/20/2002,12:34:04.920,Pass,Random,Pick Item - "Random",Pass,437,1,20036,
  ⎪ 8,7/20/2002,12:34:05.360,Pass,Fly To:_0,Info - "Value",Pass,103,1,20003,
  ⎪ 8,7/20/2002,12:34:05.470,Pass,General Function,Sent By The Tester,Random Selection Value:
  ⎩ (Portland),0,1,20010,  108b
    8,7/20/2002,12:34:05.470,Pass,,Update - "loop",8,0,1,20023,
```

AUTOMATED SOFTWARE TESTING AND VALIDATION SYSTEM

RELATED APPLICATIONS

This application claims the benefit of U.S. Provisional Application No. 60/308,453, first named inventor E. Givoni, filed Jul. 27, 2001, and U.S. Provisional Application entitled "Automated Software Testing and Validation System," first named inventor E. Givoni, Ser. No. 60/399,586 filed concurrently, i.e., Jul. 29, 2002. The entire teachings of the above applications are incorporated herein by reference.

BACKGROUND

In a software development environment, proper testing is a significant component of the resources required to develop a market acceptable software product. Aggressive development schedules may force trimming of time, human resource, and monetary resources invested in a product. Often, testing phases are accelerated or truncated, rather than sacrificing product functionality already promised to customers, in an effort to maintain cost and ship date milestones. Accordingly, testing may be performed in an ad-hoc, unrepeatable manner. Incomplete testing leads to a product in which many customer execution scenarios have not been exercised, promoting bugs in the released product. Unrepeatable tests require redundant effort to retest upon successive releases or revisions. Such practices tend to allow deployment of a product that is prone to short revision cycles and release of bug fix "patches," which exacerbate the problem presented by unrepeatable testing.

Scripting methods are known that provide for development of test script files to emulate actual use of a software product. A test script file attempts to codify the inputs and outputs for the operation of a software product, allowing a predetermined input to be associated with an expected output. Aggregation of test script files covering a range of expected operations, along with the expected outputs, allows many test scenarios to be executed by the software product in a relatively short time, mitigating the burdens of manual input and manual determination of a correct result. One such prior art test scripting system is WinRunner™, marketed commercially by MERCURY INTERACTIVE®.

However, a large array of test scripts becomes prone to maintenance issues itself. Revisions to keep test scripts current also require substantial resources. Absence of a unified scripting approach may cause scripts developed by one tester to be unwieldy by another tester, and thus trigger duplication of effort. Incomplete or inaccurate revisions of the test scripts make it unclear whether a failure result is caused by software bugs or merely incorrect test scripts. As a result, software product testing remains an unglamourous, underestimated, and often overlooked, but necessary aspect to software product development.

SUMMARY

A system and method for automated software testing and validation allows automated test generation, execution, and result correlation in a recreatable and readily adaptable manner.

More particularly, a software application under test (AUT) is identified and can include a plurality of processes; each process can have a sequence of Graphical User Interface (GUI) windows. A learning module can learn, or build, for the processes in the AUT, a test thread tree corresponding to the windows in the process. Each of the windows has at least one data object operable to receive an object value. A grid can then be generated, from the test thread tree, to enumerate test cases indicative of the windows and data objects in the thread. Also generated from the test thread tree can be a script indicative of each of the test cases. The script can be operable to be executed by a test engine to apply each of the test cases to the AUT. The script can be executed in the test engine, for example, by sending each of the test cases to the AUT and receiving a test response for each test case from the AUT. A test report can then be generated, indicative of an expected response, and compared to the actual responses to provide a test result indicative of a status of pass or fail for each test case in question.

The grid can further include grid entries, each corresponding to a test case. Each grid entry can have column entries corresponding to each data object in each window in the process identified by the test thread tree. The data objects can be sent to the AUT according to the script by, for example, interfacing with the GUI message passing mechanism employed by the AUT and the corresponding GUI. The grid entries may be populated manually via tester input, by automated mechanisms such as from a database, or other suitable means.

As the script is executed, each data object can be provided an object value from the grid. The script can then reference the grid according to the window sequence of the GUI, and determine object values from the corresponding test case for each data object. The script can further include execution looping constructs, randomizing operations to select from a pulldown list, or combo box, and function statement interfaces to provide flow modifications such as checkpoints, external function hooks, and library operations.

BRIEF DESCRIPTION OF THE DRAWINGS

The foregoing and other objects, features and advantages of the system and method for automated software testing and validation will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

FIGS. 6a–6f are an example of a test of a software application under test (AUT)

DETAILED DESCRIPTION

Figure 1:
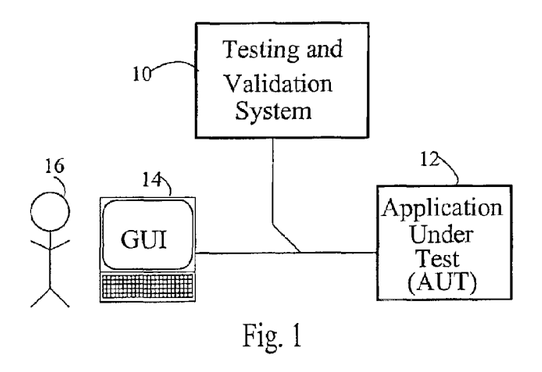
FIG. 1 is a context diagram of testing an AUT.

A particular system and method disclosed herein allows a testing and validation system to test a software application under test (AUT) by traversing user interface displays, or windows, in the Graphical User Interface (GUI) of the AUT to build a test thread tree. The test thread tree is employed to generate a grid, a script, and a report enumerating each test case, described further below, and the test is executed by interfacing with the GUI of the AUT. FIG. 1 is a context diagram for testing an AUT. Referring to FIG. 1, the testing and validation system 10 interfaces between an AUT 12 and the GUI 14 employed by a user 16 in actual operation of the AUT 12. The system 10 first builds the test cases by traversing the window sequence in the processes of the AUT 12 to obtain the expected inputs and outputs. The AUT may be in communication with the GUI 14 via a local direct connection, via a remote connection such as the Internet, or other suitable connection. By emulating the inputs and outputs between the GUI 14 and the AUT 12, the system 10 executes the generated test cases in an automated manner.

Figure 2:
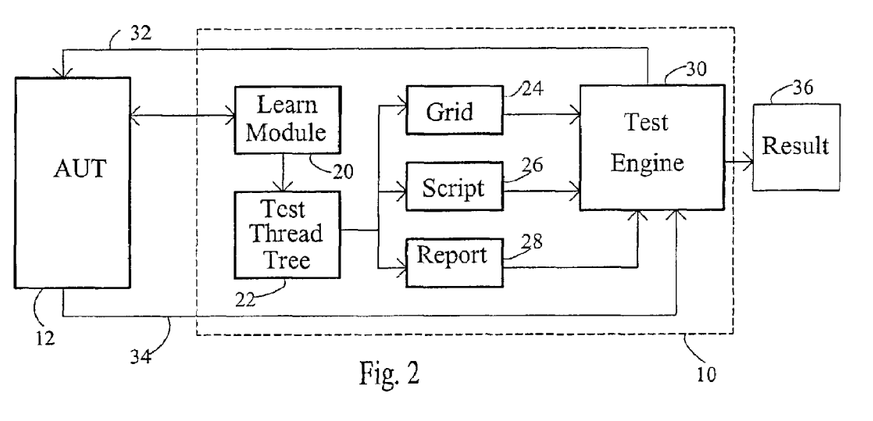
FIG. 2 is a block diagram of the automated software testing and validation system as defined herein.

FIG. 2 is a block diagram of a particular automated software testing and validation system 10 in greater detail. Referring to FIG. 2, a learn module 20 traverses the AUT 12 to determine the processes and associated window sequences. In a particular embodiment, the windows conform to a protocol such as MICROSOFT® WINDOWS®, as is knows to those skilled in the art, however alternate windows platforms could be employed. Each process so identified includes a sequence of windows, and each window includes one or more data objects. A windows data object corresponds to a visible GUI field adapted to receive input, such as a point-and-click mouse button input, a free form text entry, or others described further below. The learned windows and corresponding data objects are aggregated into a test thread tree 22, which includes a sequence of all the data objects for a particular process in the AUT 12. In a particular embodiment the test thread tree 22, or GUI tree, for a particular process is initially learned by manually traversing the windows of a particular process by a tester to identify the windows and data objects in the process. It should be understood that other mechanisms of building the test thread tree may be employed.

The windows and data objects in the process are learned by traversing the sequence of windows and corresponding data objects in the process under test. In such a windows platform, each window and data object has properties which may be accessed by the learn module. The properties are accessed in response to user input which defines the data objects in the test, and such properties are retrieved via the windows platform to build the test thread tree 22.

The test thread tree 22 is employed to generate a grid, a script, and a report for the process. For a particular process, the grid, script, and report enumerate a plurality of test cases covering the process. The grid 24 includes an grid entry, or row, for each test case. Each column in the grid 24 identifies a data object from the test thread tree 22. For each column entry, an object value corresponding to the data object may be specified, as will be described further below. Further, a regression manager may be employed to aggregate a plurality of test cases. The aggregated test cases may then be executed according to a particular testing priority.

The script 26 specifies the order in which the grid 24 entries will be executed in the AUT 12. During execution, the script 26 accesses the grid 24 and specifies object values to be applied to the data objects for each test case. The script specified object values are applied, or sent, to the AUT 12 by the test engine 30, as shown by arrow 32.

The report 28 is an enumeration of expected outputs, or expected test responses, to be returned by the AUT 12. Correlation of the report 28 with the test responses 34 by the test engine 30 allows the pass or fail test result 36 to be computed for all the test cases of a process.

Figure 3:
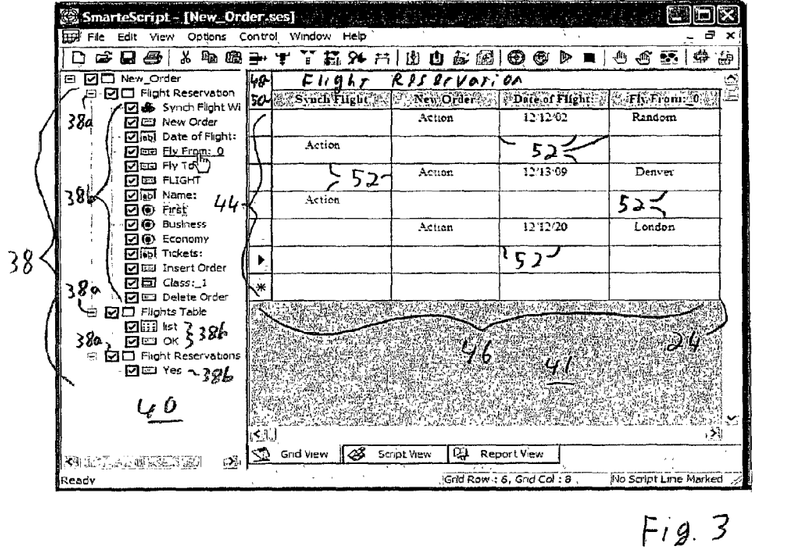
FIG. 3 is a screen diagram of a grid view.

FIG. 3 is a screen diagram of the of the grid view following learning of the test thread tree 22 (FIG. 2). Referring to FIGS. 3 and 2, a test thread window 40 displays the test thread tree 38 in a hierarchical form showing each window 38a in order along with the child data objects 38b in includes. A test display window 41 displays the grid 24 with grid entries 44 for each test case, and columns entries 46 corresponding to each data object 38b. The grid denotes window headings 48 for each window 38a in the test thread tree, and further has object headings 50 denoting the data objects 38b in the window 38a. Object values 52 to be employed for a particular data object in a test case are indicated by the intersection of each grid row 44 and column 46, and may be null if no object value 52 is to be entered.

The grid display allows a plurality of test cases to be generated for the learned test thread tree 38. A test engineer navigates the grid 24 and provides corresponding object values 52 to be employed for a test case. Further, the test engineer may query the data object type and window type via the test thread tree 38. As each data object has a type, an appropriate range of object values is defined. Erroneous, or negative testing cases may therefore also be generated by providing an object value outside the expected range. Exemplary data object types include free form text, push button, radio button, action button, combo box, check button, menu item, page tab, item list, and tool bar. Other data object types may be employed.

Figure 4:
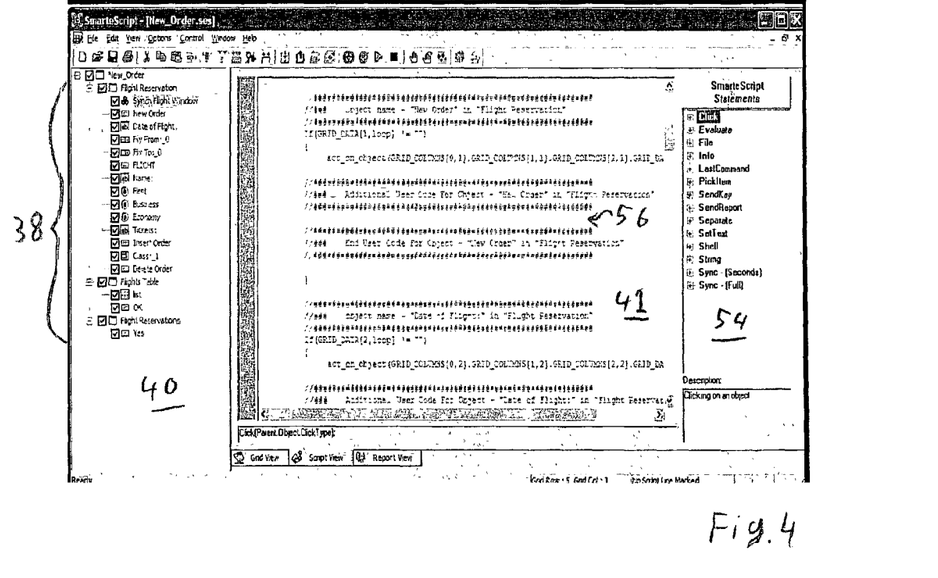
FIG. 4 is a screen diagram of a script view.

FIG. 4 is a screen diagram of a script view. Referring to FIGS. 4, 3, and 2, the test thread window 40 shows the test thread tree 38, as in FIG. 3, however the test display window 41 displays the script 26 corresponding to the grid 24. The script 26 contains the instructions to be executed by the test engine 30, and references the corresponding object values 52 from the grid 24. A statement window 54 contains additional statements, or flow modifications, which can modify the script 26 via the user code sections 56 in the script. The script will also be described in further detail below with respect to FIGS. 6c and 6d.

Figure 5:
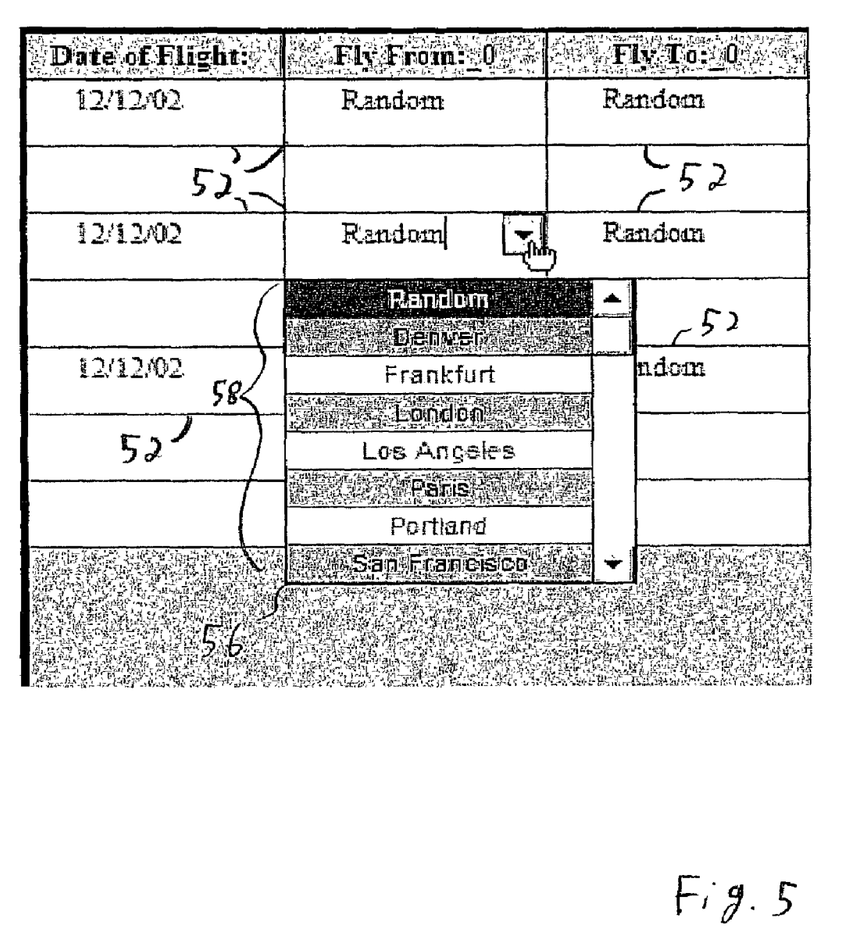
FIG. 5 shows the random operation of an object value in the grid.

FIG. 5 shows the random operation of an object value 52 in the grid 24. Referring to FIGS. 5 and 3, each data object 38b has a type. As described above, the type indicates the input expected, such as mouse click, text entry, or others. A pull-down menu 56, or combo-box, allows selection from a predetermined set of values. A grid 24 object value 52 of "random" indicates that the test engine 30 will select randomly from the available predetermined values 58. This particular pulldown menu, or combo box, is employed in the example below with respect to FIGS. 6a–6f.

Figure 6A:
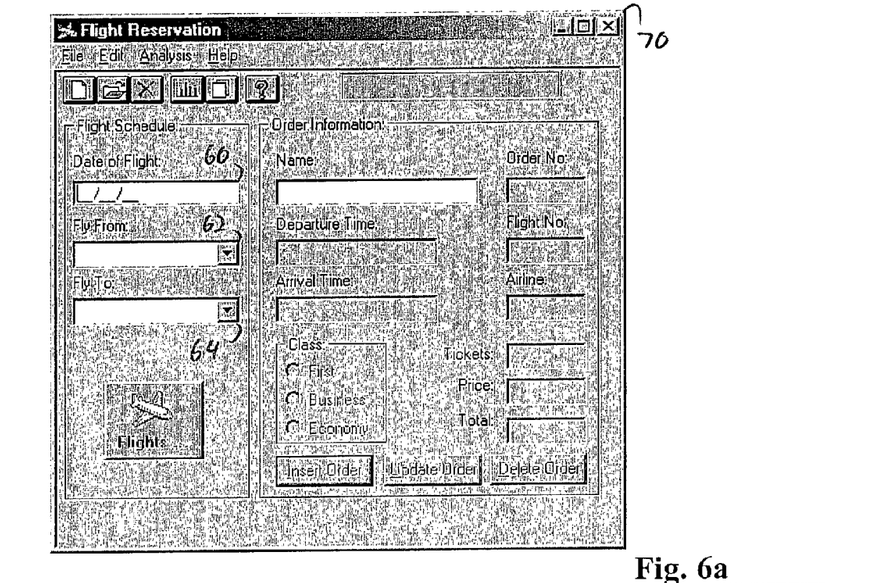

FIGS. 6a–6f are an example of a test of a software application under test (AUT). Referring to FIG. 6a and 2, a window 70 of a AUT is shown. The window 70 is titled "flight reservation" and contains the data objects "date_of_flight" 60, "fly_from" 62, and "fly_to" 64. Employing the learn module 20, the window and the data objects are learned to create the test thread tree 66 containing the data objects 66a, 66b and 66c shown in the test thread tree window 40 in FIG. 6b.

In a particular embodiment, grid data entry may be automated by reading the grid entries from a database or other mass storage vehicle. The grid entries may therefore be populated by reading test case entries to populate the rows and columns in the grid. Further, object values in the grid may be propagated across each of the rows or columns by a single operation.

Figure 6B:
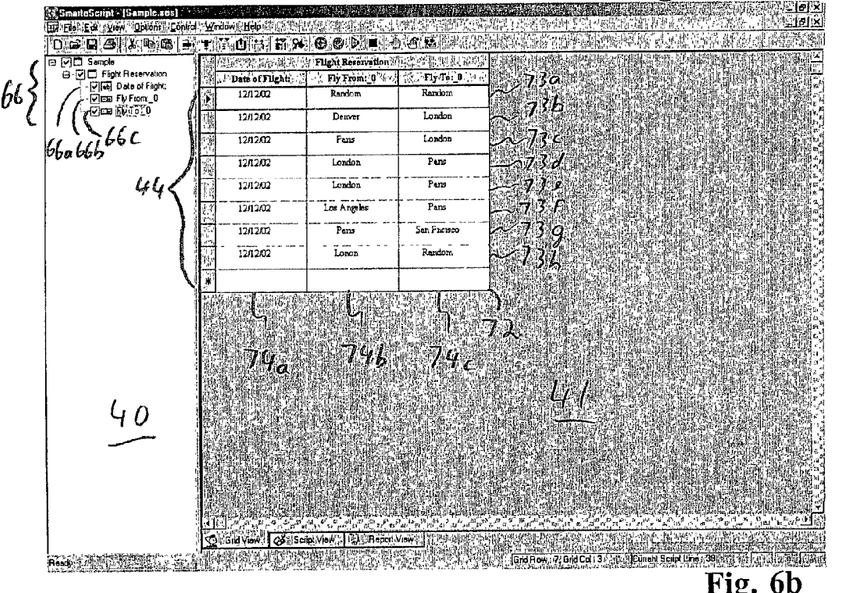

Referring to FIG. 6b, the test thread tree 66 is employed to generate the grid 72 in the display window 41. The grid 72 has grid column entries 74a, 74b, and 74c corresponding to the data objects 66a, 66b, and 66c, respectively. A plurality of test cases 73a–73h are generated, each containing object values 52 (FIG. 5) for the data objects 74a–74c. The number of test cases generated in the grid is selected by the test engineer, and may be derived during the learn function. Alternatively, the number of test cases may be derived automatically by traversing the code in the process. A variety of methods may be employed to determine the number of test cases for the process, and may include determination of the number of linearly independent paths through the process (cyclomatic complexity), all possible permutations of code, and paths sufficient to execute each line of code at least once. Other metrics may also be employed.

Figure 6C:
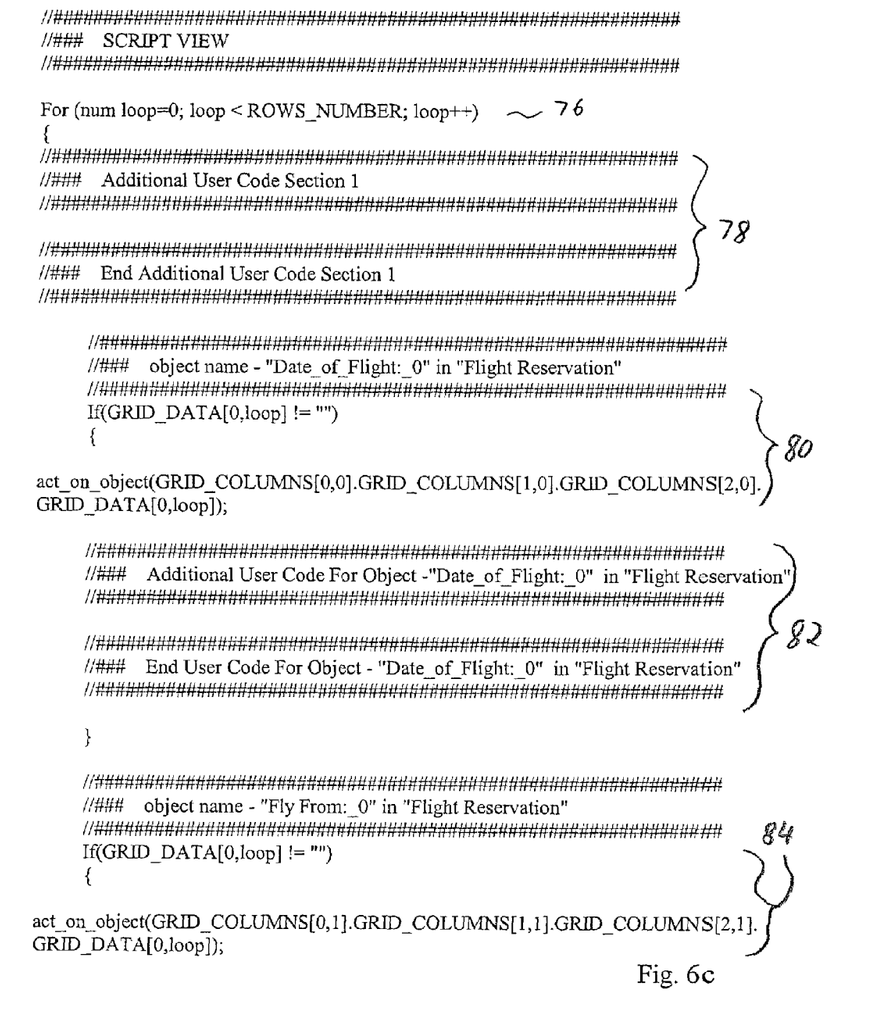
Figure 6D:
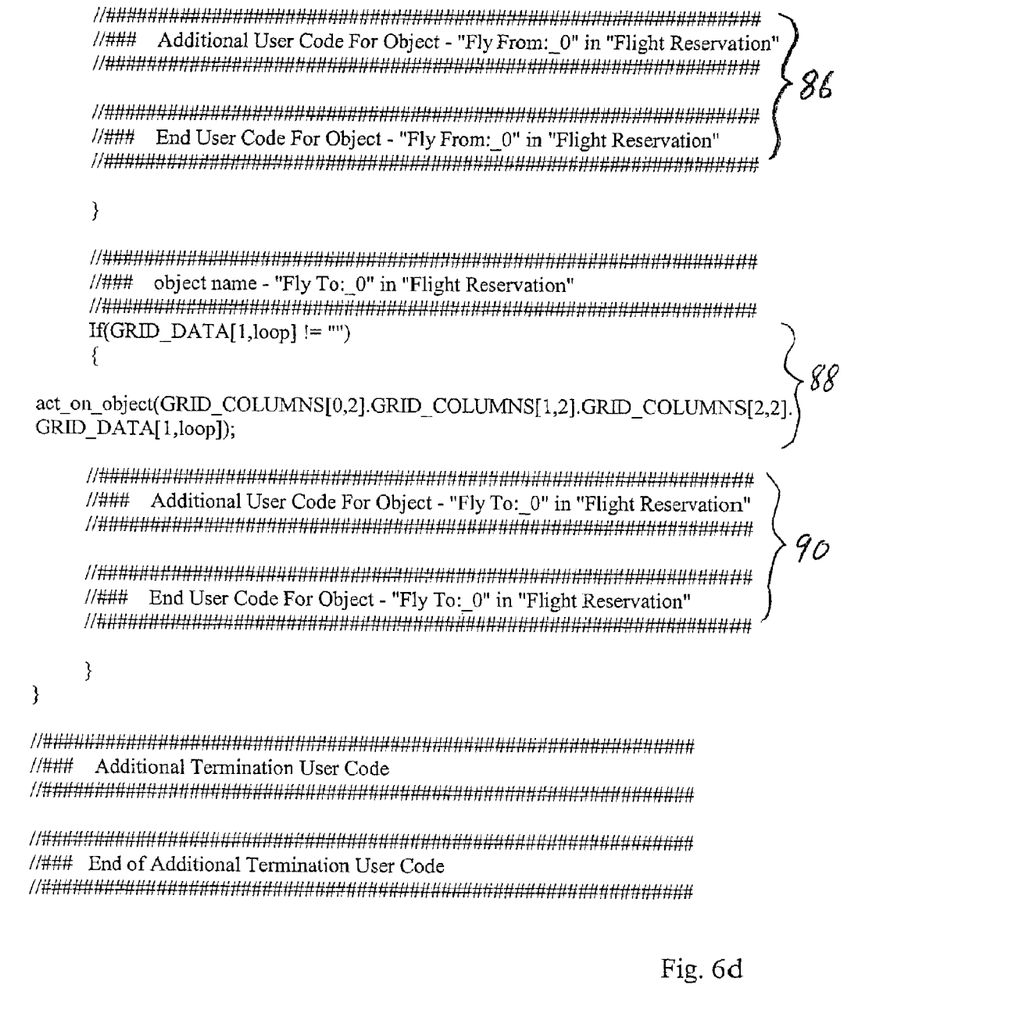

FIGS. 6c and 6d show the script 26 corresponding to the test tree 66. As described above, the script contains the instructions invoked by the test engine 30 for executing the test. Referring also to FIGS. 6c and 6d, an initial iteration loop is established by a code portion 76. The iteration loop initializes the test execution loop index to execute each test case 73n in the grid 72. An optional code portion 78 is provided for modifications and enhancements to the script such as statements from the statement window 54 (FIG. 4). The script then executes according to the loop index which specifies which test case from the grid 72 will be applied to the AUT. Code portion 80 is directed to the date_of_flight 74a data object, and inserts the object value 52 from the column entry 74a corresponding to the test case 73a–73h, in the order according to the loop index. A null check is also made to ensure that an object value is defined for the particular test case. Code portion 82 allows insertion of statements specific to the date_of_flight data object, and may even conditionally reference the loop index for test case specific actions, similarly to code portion 78.

Code portion 84 executes test cases for the fly_from 74b data object similar to code portion 80, and also provides a similar data object specific portion 86. Code portion 88 applies test cases to the fly_to 74c data object, and employs the data object specific portion 90.

For each successive iteration, the script is executed for each case according to the loop index, populating data objects with the corresponding object values from the grid, and generates a result 36 discussed further below with respect to the report 28 (FIG. 2). For example, iteration 4 (loop=4) executes the code portions above with the object values from row entry 73d, in order from 74a, 74b and 74c.

FIGS. 6e–6f show the test results 36 corresponding to the grid 76 and the script in FIGS. 6c–6d. The test result is determined by comparing the expected responses from the report 28 to the actual responses 34 sent by the AUT in response to the test engine 30 executing the script 26 (FIG. 2). Referring, to FIGS. 6e–6f and also to FIGS. 6a–6d, a test case result 101 indicates a date_of_flight 74a entry of "12/12"02", and a random entry for both fly_from 74b and fly_to 74c. Referring to the test case result 101, the random selection "San Francisco" 101a was selected for the "fly_from" entry, and a random selection "Denver" 101b was selected for the fly_to entry. As both random selections are valid selections for the corresponding combo box data object, the result 101 indicates all pass entries 92 for each of the object values shown for test case 73a.

Test case iteration 2 (73b) provides an object value of "12/12/02" for the date_of_flight 74a. In this test case, object values of "Denver" 74b and "London" 74c are specified, rather than the random function, for data objects 66b and 66c, respectively. As shown by test case result 102, object values "12/12/02" 102a, "Denver" 102b and "London" 102c indicate a test case result 92 of pass.

Test cases iterations 3, 4, 5, and 6, (103, 104, 105, and 106, respectively) execute similarly, and all indicate an overall result 92 of pass. Test case iteration 7 (107), however, indicates an object value of "San Francisco" per grid entry 73g, data object 74c.

Referring to test case result 107a, "San Francisco" indicates a failure result because the item is not in the combo box list 56 (FIG. 5). Test case iteration 8 (108), similarly, provides an object value of "Lonon" for data object 74b. Accordingly, test case result 108a returns a failure result because "Lonon" is not in the expected list of object values. Note further that the random operation is again employed in test case 8 and returns a value of pass for test case object value "Portland" 108b.

Figure 7:
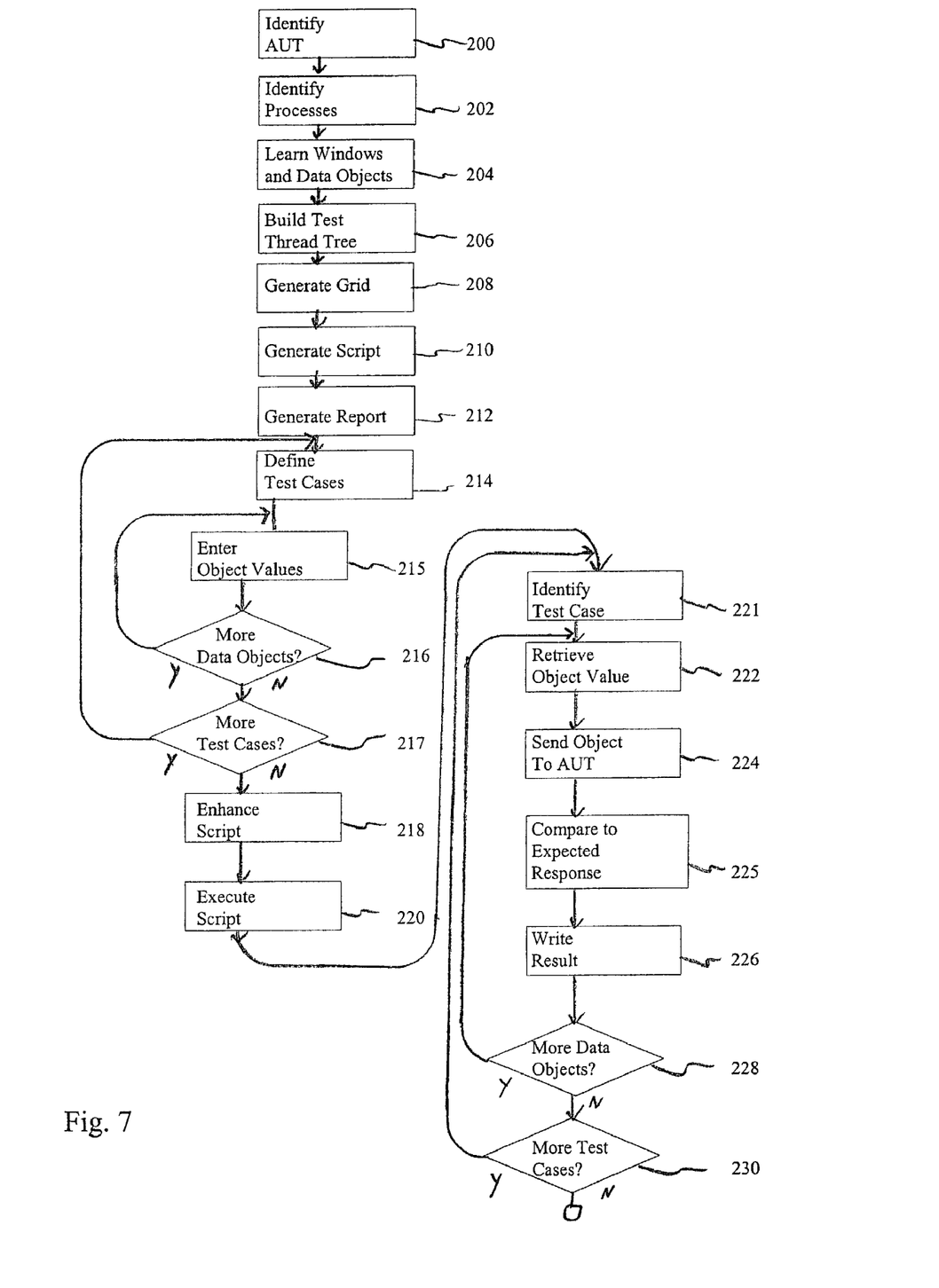
FIG. 7 is a flowchart of generation and execution of a script employed to test an AUT.

FIG. 7 is a flowchart of generation and execution of a script employed to test an AUT. Referring to FIGS. 7 and 2, an AUT 12 is identified, as depicted at step 200. Processes within the AUT 12 corresponding to threads to be tested are identified, as shown at step 202. Employing the learning module 20, the windows and data objects within the process are learned, as disclosed at step 204. A test thread tree 22 corresponding to the AUT 12 is built by the learn module 20, as depicted at step 206. The grid 24 representation is generated from test thread tree 22 by defining rows entries corresponding to test cases 44 and grid column entries 46 (FIG. 3) corresponding to the data objects 66n, as shown at step 208. The script 26 is then generated from the test thread tree 22 corresponding to the grid 24 and the data objects 66n therein, as depicted at step 210. The report 28 of expected responses is generated, for comparison to the test responses 34 from the AUT, as disclosed at step 212. Test cases are defined in the grid 24, as shown at step 214. For each test case, object values are entered in the grid 24 to correspond to data objects in the test thread tree 22, as shown at step 215. A check is performed to determine if there are any more data objects 66n in this test case, as depicted at step 216. If not, a check is performed to determine if there are more test cases 44 for this test thread tree 22, as disclosed at step 217. Once the grid 24 is complete, the script 26 may be enhanced with statements or test case specific modifications, as shown at step 218. Note that the serial flow control shown here is exemplary for clarity, and that test case definition allows toggling between grid definition and test script enhancements and modifications.

Following completion of the grid object value 52 definition and the script modifications, the test cases 44 in the script 26 are ready to be executed by the test engine 30, as shown at step 220. The test case 44 is identified by the script 26 via the loop index, as depicted at step 221. For each data object 66n in the test case, an object value 52 is retrieved from the grid to populate the data object 66n, as depicted at step 222. The data object 66n is sent to the AUT, as shown at step 224 and the response 34 compared to the expected test response in the report 28, as disclosed at step 225. The result of pass/fail and other parameters are written to the result 36, as depicted at step 226. A check is performed to determine if there are more data objects in the test case, as shown at step 228. If there are more data objects, control reverts to step 222, otherwise a check is performed to determine if there are more test cases in this grid, as depicted at step 230. If there are more test cases, then control reverts to step 221, otherwise the result 36 is complete and may be inspected for overall test status.

In the course of testing, it may be beneficial to customize certain test cases or perform special processing for a particular data object. Such extensions and modifications may be employed, as discussed above with respect to FIGS. 6d and 6e. Such modifications include breakpoints, which allow a script to be executed in segments. Breakpoints facilitate partial thread testing by pausing script execution at designated points in the script and returning control to the user. Checkpoints provide a mechanism to visually inspect a window for correct data objects and text. Another test enhancement provides for additional user code, either via external function libraries or the statements included in the statement window, described above. Such modifications provide for external function hooks into a test for predefined or ad-hoc generated enhancements. Other customization vehicles may be envisioned by those skilled in the art without departing from the scope of the invention as defined by the claims.

Those skilled in the art should readily appreciate that the applications and programs for automated script processing as defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to particular embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for automated software testing and validation comprising computer implemented steps of:
    identifying a software application under test (AUT), the AUT including processes, each process having at least one user interface display;
    learning, for at least one process in the AUT, a test thread tree corresponding to the user interface displays in the process, each of the user interface displays having at least one data object;
    generating, from the test thread tree, a grid enumerating a plurality of test cases indicative of the data objects in the process; and
    generating, from the test thread tree, a script indicative of the plurality of test cases, the script operable to be executed by a test engine.

2. The method of claim 1 further comprising executing the script in the test engine, the executing further comprising:
    sending each of the test cases to the AUT; and
    receiving a response for each test case from the AUT.

3. The method of claim 2 further comprising:
    generating a test report indicative of an expected response; and comparing the report to the responses to provide a test result.

4. The method of claim 2 wherein executing the script further comprises:
    interfacing with a Graphical User Interface (GUI) of the AUT; and
    sending and receiving messages to the AUT corresponding to the test cases and responses, respectively.

5. The method of claim 1 wherein generating the grid further comprises generating a grid entry including a row for each test case, wherein each row further comprises a column entry corresponding to a particular data object.

6. The method of claim 1 wherein generating the grid further comprises gathering object values, each of the object values indicative of a particular data object for a particular test case.

7. The method of claim 6 wherein gathering the object values further comprises a random operation operable to provide data from a plurality of predetermined values.

8. The method of claim 1 wherein the AUT further comprises a graphical user interface (GUI) and learning the test thread tree further comprises traversing a window sequence of a plurality of the windows of the GUI.

9. The method of claim 1 wherein generating the script further comprises generating an executable loop, the executable loop operable to perform successive iterations of test cases for each data object.

10. The method of claim 1 wherein generating the script further comprises applying flow modification to the script, the flow modifications operable to direct execution of the script and including breakpoints, checkpoints, function hooks, and library operations.

11. The method of claim 1 wherein the user interface displays are windows.

12. The method of claim 11 wherein the windows conform to a predetermined protocol.

13. The method of claim 1 wherein the data objects further comprise free form text, push button, radio button, action button, combo box, check button, menu item, page tab, item list, and tool bar.

14. The method of claim 1 wherein generating the grid further comprises importing object values from an external database, the external database operable to populate the grid in an automated manner.

15. The method of claim 1 wherein generating the grid further comprises propagating an object value across multiple grid entries from a particular object value.

16. The method of claim 1 wherein a plurality of scripts are aggregated by a regression manager, the regression manager operable to execute the scripts according to a predetermined priority.

17. A computer system Comprising a graphical user interface display operable by a user for interfacing with a software Application Under Test (AUT) comprising:
    at least one process, the process having a sequence of user interface displays, the user interface displays each having at least one data object;
    a learn module operable by a user to navigate the user interface displays in the process and gather a test thread tree indicative of a sequence of data objects;
    a grid corresponding to the test thread tree, the grid having test case entries including column entries corresponding to the sequence of data objects; and
    an automatically computer generated script corresponding to the test thread tree, the script operable to be executed by a test engine for retrieving the test case entries from the grid and applying the column entries to the sequence of data objects corresponding to a test case.

18. The graphical user interface display of claim 17 wherein the grid further comprises object values corresponding to a particular data object for a particular test case.

19. The graphical user interface display of claim 18 wherein the grid further comprises columns adapted to store a object value corresponding to a particular data object, and the test case entries are rows including the object value for each of the data objects in the test case.

20. The graphical user interface display of claim 17 further comprising a report indicative of an expected response, wherein responses to the executed script are adapted to be compared to the expected responses to generate a test result.

21. A computer implemented method of automated script testing of an application under test comprising:
   identifying a software application under test (AUT), the AUT having a Graphical User Interface (GUI) for sending and receiving messages corresponding to user instructions;
   identifying at least one process in the AUT, each of the processes having a sequence of user interface displays, each of the user interface displays having at least one data object;
   traversing, by a learn module, the sequence of user interface displays in the process to build a test thread tree indicative of the sequence of data objects in the process;
   generating, from the test thread tree, a grid adapted to store a set of object values corresponding to each of the data objects in the process, the grid further operable to store a plurality of test cases each containing the set of object values;
   generating, from the test thread tree, a script operable to be executed by a test engine, the grid responsive to the test engine;
   generating, from the test thread tree, a report indicative of an expected response to each of the data objects in the grid;
   executing the script by iterating through each test case in the grid and, in each test case, applying the object values to the correspondingdata objects in the process;
   receiving a response from the AUT based on the applied object values; and
   comparing the response to the expected response to generate a result.

22. The method of claim 21 wherein applying further comprises sending the object values to the AUT and receiving a response indicative of success or failure.

23. The method of claim 21 wherein the user interface displays are windows.

24. A computer system for automated software testing and validation comprising:
   a software application under test (AUT), the AUT including processes, each process having at least one user interface display;
   a learning module operable to learning for the processes in the AUT, a test thread tree corresponding to the user interface displays in the process, each of the user interface displays having at least one data object;
   a grid, generated from the test thread tree, enumerating a plurality of test cases indicative of the data objects in the process;
   a script, automatically computer generated from the test thread tree, indicative of the plurality of test cases; and
   a test engine, the script and the grid responsive to the test engine for executing the script and applying the corresponding test cases to the AUT.

25. The system of claim 24 further comprising a response, the response received by the test engine in reply to each applied test case from the executed script.

26. The system of claim 25 further comprising:
   a test report, generated from the test thread tree, indicative of an expected response; and
   a test result computed by comparing the report to the responses.

27. The system of claim 24 wherein the grid further comprises
   a grid entry including a row for each test case; and
   a plurality of columns in the grid, each column corresponding to a particular data object in the process.

28. The system of claim 24 further comprising a regression manager operable to execute a plurality of test cases according to a predetermined priority.

29. A computer readable medium for automated software testing and validation comprising:
   computer program code for identifying a software application under test (AUT), the AUT including processes, each process having at least one user interface display;
   computer program code stored on a computer readable storage medium for learning, for at least one process in the AUT, a test thread tree corresponding to the user interface displays in the process, each of the user interface displays having at least one data object;
   computer program code for generating, from the test thread tree, a grid enumerating a plurality of test cases indicative of the data objects in the process; and
   computer program code for automatically generating, from the test thread tree, a script indicative of the plurality of test cases, the script operable to be executed by a test engine.

30. A computer system for automated software testing and validation comprising:
   means for identifying a software application under test (AUT), the AUT including processes, each process having at least one user interface display;
   means for learning, for at least one process in the AUT, a test thread tree corresponding to the user interface displays in the process, each of the user interface displays having at least one data object;
   means for generating, from the test thread tree, a grid enumerating a plurality of test cases indicative of the data objects in the process; and
   means for automatically generating, from the test thread tree, a script indicative of the plurality of test cases, the script operable to be executed by a test engine.

* * * * *

UNITED STATES PATENT AND TRADEMARK OFFICE
CERTIFICATE OF CORRECTION

PATENT NO. : 7,093,238 B2
APPLICATION NO. : 10/208649
DATED : August 15, 2006
INVENTOR(S) : Ethan Givoni et al.

It is certified that error appears in the above-identified patent and that said Letters Patent is hereby corrected as shown below:

<u>Column 9</u>
Line 38, insert a space between the words "correspondingdata" so that it reads "corresponding data".

<u>Column 10</u>
Line 26, insert the words --stored on a computer readable storage medium-- after computer program code so that it reads "computer program code stored on a computer readable storage medium…".

<u>Column 10</u>
Lines 29 and 30, delete the words "stored on a computer readable storage medium".

Signed and Sealed this

Fourteenth Day of November, 2006

JON W. DUDAS
*Director of the United States Patent and Trademark Office*